United States Patent
Bainter

(10) Patent No.: US 11,406,072 B1
(45) Date of Patent: Aug. 9, 2022

(54) APPARATUS FOR STABILIZING IRRIGATION TOWERS

(71) Applicant: Wesley Allen Bainter, Hoxie, KS (US)

(72) Inventor: Wesley Allen Bainter, Hoxie, KS (US)

( * ) Notice: Subject to any disclaimer, the term of this patent is extended or adjusted under 35 U.S.C. 154(b) by 0 days.

(21) Appl. No.: 17/192,011

(22) Filed: Mar. 4, 2021

Related U.S. Application Data

(63) Continuation-in-part of application No. 16/750,178, filed on Jan. 23, 2020, now abandoned, which is a continuation of application No. 16/112,341, filed on Aug. 24, 2018, now abandoned, which is a continuation of application No. 15/227,014, filed on Aug. 3, 2016, now Pat. No. 10,064,349.

(60) Provisional application No. 62/258,078, filed on Nov. 20, 2015, provisional application No. 62/203,736, filed on Aug. 11, 2015.

(51) Int. Cl.
  *A01G 25/09* (2006.01)
(52) U.S. Cl.
  CPC .................... *A01G 25/092* (2013.01)
(58) Field of Classification Search
  CPC ..................................... A01G 25/092
  See application file for complete search history.

(56) References Cited

U.S. PATENT DOCUMENTS

| | | |
|---|---|---|
| 2,582,416 A | 1/1952 | Gail |
| 2,726,895 A | 12/1955 | Behlen |
| 3,147,764 A | 9/1964 | Jensen |
| 3,202,172 A | 8/1965 | Bergeron et al. |
| 3,281,081 A | 10/1966 | Purtell |
| 3,381,393 A | 5/1968 | Smith, Jr. |
| 3,415,270 A | 12/1968 | Stillwell |
| 3,503,556 A | 3/1970 | Moulton |
| 3,610,531 A | 10/1971 | Erickson |
| 3,770,202 A | 11/1973 | Ivemy et al. |
| 3,917,171 A | 11/1975 | Reinke |
| 3,957,204 A | 5/1976 | Farris et al. |
| 4,059,911 A | 11/1977 | Bean et al. |
| 5,685,497 A | 11/1997 | Cole |
| 6,431,475 B1 * | 8/2002 | Williams ............... A01G 25/09 239/740 |
| 6,663,028 B2 | 12/2003 | Malsam et al. |
| 7,938,343 B2 | 5/2011 | Vorderstrasse et al. |
| 8,702,014 B1 | 4/2014 | Bullard |
| 10,064,349 B1 | 9/2018 | Bainter |
| 10,806,106 B2 * | 10/2020 | Olson ..................... A01G 25/09 |

(Continued)

*Primary Examiner* — Nicole T Verley
(74) *Attorney, Agent, or Firm* — Robert Blinn

(57) ABSTRACT

A stabilizing apparatus for stabilizing a mobile irrigation tower of a pivot irrigation system includes a pair of outrigger arms which extend from opposite sides of the irrigation tower. The outrigger arms are able to move between an extended position and a retracted position. The distal ends of the out rigger arms present ground engaging elements adapted for low friction passage across a farm ground surface. When the outrigger arms are in the extended position, the ground engaging element of each arm is in contact with or at least in close proximity to the farm ground surface at a location which is spaced transversely away from the irrigation tower. If the outrigger arms are in the extended position and if the irrigation system is subjected to a high velocity wind, the ground engaging elements will engage the farm ground surface and resist overturning movement of the irrigation tower.

2 Claims, 12 Drawing Sheets

(56) References Cited

U.S. PATENT DOCUMENTS

| | | |
|---|---|---|
| 2011/0017850 A1 | 1/2011 | Waybright |
| 2014/0326808 A1 | 11/2014 | Malsam |
| 2017/0000047 A1 | 1/2017 | Binder |

\* cited by examiner

APPARATUS FOR STABILIZING IRRIGATION TOWERS

CROSS REFERENCES TO RELATED APPLICATIONS

This application is a continuation-in-part of U.S. patent application Ser. No. 16/750,178 which was filed on Jun. 1, 2020, which is incorporated herein by reference, U.S. patent application Ser. No. 16/750,178 was a continuation of U.S. patent application Ser. No. 16/112,341 filed on Aug. 24, 2018 which is incorporated herein by reference.

U.S. patent application Ser. No. 16/112,341 was a continuation of U.S. patent application Ser. No. 15/227,014 filed on Aug. 3, 2016, now issued as U.S. Pat. No. 10,064,349, which are incorporated herein by reference.

U.S. patent application Ser. No. 15/227,014 claimed the benefit of U.S. Provisional Patent Application No. 62/258,078 filed on Nov. 20, 2015 and U.S. Provisional Patent Application No. 62/203,736 filed on Aug. 11, 2015, both of which are incorporated herein by reference.

FIELD

This invention relates to an apparatus for stabilizing irrigation towers of mobile irrigation systems, particularly pivot irrigation systems.

BACKGROUND

Mobile irrigation systems and particularly pivot irrigation systems are used by dry land farmers to irrigate circular areas of square portions of farmland which usually extend approximately 2,640 feet (805 meters) on each side. Accordingly, a mobile irrigation system may include a stationary pump, an irrigation pipe elevated by mobile towers which feeds spaced irrigation heads which broadcast water. A common configuration is a center pivot system in which an elevated irrigation pipe and spaced irrigation heads are arranged radially from a center pivot. The center pivot portion of the system includes a stationary pump for supplying water to the center pivot system. Center pivot irrigation systems usually broadcast water in circular, semicircular and even quarter-circular patterns. Mobile irrigation towers are usually supported by powered wheels for gradual movement. In a center pivot system, the wheel rotation rate is in proportion to the distance between a particular irrigation tower and the center pivot. In a center pivot system, the irrigation heads broadcast water at rates that are also proportional to their distances from the center pivot. Although the applicant will refer to "pivot irrigation systems" in this specification, the skilled reader should understand that this also includes so called "windshield wiper" irrigation systems used for irrigating rectangular areas of farm ground or smaller areas and even mobile tower systems which do not pivot about a center. Non-pivoting systems include an elongated raised pipe supported by evenly spaced mobile irrigation towers which all move at a constant in order to irrigate rectangular strips of land. The mobile towers of such strip irrigation systems are also susceptible to being overturned by high winds.

A significant risk encountered by farmers using mobile irrigation systems is the tendency of the elevated irrigation pipe and the mobile towers supporting the pipe to overturn in high wind conditions which occasionally occur in areas of the Midwest. The tendency to overturn is most pronounced in a center pivot system toward the distal end of the elevated irrigation pipe. Further, it is generally advantageous to build pivot irrigation systems from lightweight structures and materials in order to minimize power consumption, material use and soil compaction. This further increases the likelihood of the irrigation structure overturning during a storm. Still further, when the system is idle, it is typically drained of water, thereby reducing the weight of the irrigation structure and its ability to withstand high winds. What is needed is an apparatus that will stabilize irrigation towers during high wind conditions, and more particularly, that will prevent irrigation towers which are spaced away from the center pivot from turning over in high wind conditions.

SUMMARY

The above noted need is addressed by an irrigation tower stabilizing apparatus including outrigger arms having transversely spaced ground engaging elements which are suitable for stabilizing an irrigation tower against high winds. Irrigation towers typically include two ground engaging wheels which are arranged to roll upon a farm ground surface and which are powered to cause the irrigation system to pivot about a center pivot. The stabilizer apparatus includes a pair of outrigger arms which are able to extend transversely from opposite sides of an irrigation tower frame. Each outrigger arm is arranged for movement between an extended position and a retracted position.

Ground engaging elements are mounted to the distal ends of the outrigger arms. The ground engaging elements are positioned so that each ground engaging element makes contact with the farm ground surface or are at least in close proximity to the farm ground surface when the outriggers arms are in the extended position. In this example, the ground engaging elements are wheels but could be skids or the like. Each ground engaging element is spaced transversely away from the nearest ground engaging wheel of the irrigation tower thereby effectively increasing the wheel base of the irrigation tower by preferably at least approximately two fold or more as conditions may require. When the outriggers are in the extended position, the overturning forces applied by high winds, with the possible exception of the most extreme tornadic winds, become insufficient for overturning the irrigation towers of a pivot irrigation system. When the outrigger arms are in the retracted position, the ground engaging elements are retracted into a position which is proximate to the irrigation tower.

DETAILED DESCRIPTION

Figure 1:
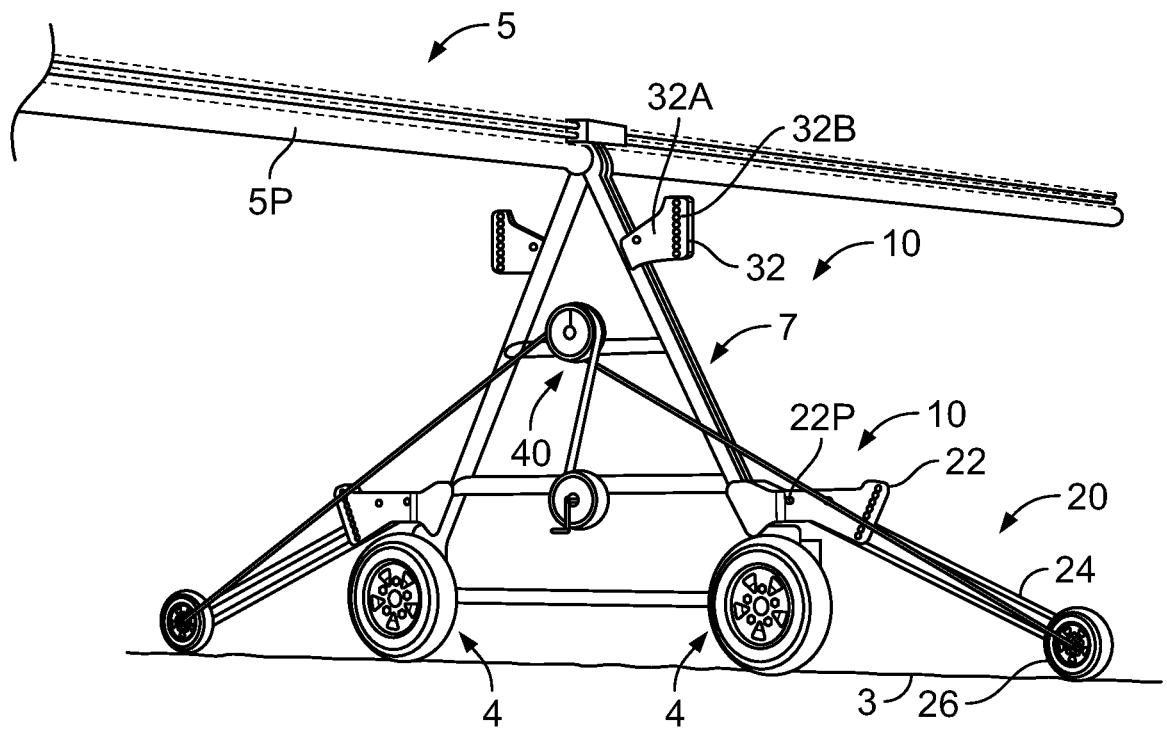
FIG. 1 is a perspective view of a first embodiment of an irrigation tower stabilizing apparatus installed on a tower of a center pivot irrigation system showing the outrigger arms in an extended position.

Referring to the figures, FIG. 1 provides a perspective view of a stabilizing apparatus 10 which is mounted to an irrigation tower frame 7 of an irrigation apparatus 5. Irrigation apparatus 5, in this example, is a pivot irrigation system which is adapted to pivot about a center point over the surface of farm ground soil 3 as indicated in FIGS. 1-4. As can be seen in FIG. 1, irrigation tower 7, in this example, includes two powered wheels 4 suitable for moving tower 7 across farm ground soil 3. In a pivot irrigation system, the speed of wheels 4 is proportional to the distance between irrigation tower 7 and the center pivot portion (not shown).

In this description and in the appended claims, "irrigation tower" should be understood as referring to a mobile irrigation tower of a center pivot irrigation system which is spaced away from the center pivot. Such irrigation towers are arranged to support a radially extending irrigation pipe ten or fifteen feet above the ground surface. Usually, water broadcasting irrigation heads are mounted to or at least in close proximity to the irrigation pipe at each irrigation tower. Such a mobile irrigation tower will typically have at least two opposite side members, a base member connecting between the side members. Wheels such as wheels 4 noted above are disposed at opposite ends of the base member and are oriented generally parallel to the base member for rolling on a circular path around the center pivot at a constant distance from the center pivot. In most cases, the base member may be a single member but the side members are usually inverted triangles including two members which extend up from the base member to the apex of the irrigation tower where they are spaced apart to define an inverted acute triangle. An irrigation tower usually presents a generally equilateral triangular form from a front view direction and presents an inverted acute triangular form from side view direction. This use of triangular structures results in a very strong and rigid structure. (Albeit, still subject to overturning in high winds.) Thus, when a "side member" is referred to in the detailed description or the appended claims, the applicant means one of the side members on one side or that the structure being recited may be arranged to be mounted between the two members on one side as if the two members actually comprised one "side member" or may be arranged to be mounted to one of the side members on one side.

As can be seen in FIGS. 1-4, stabilizing apparatus 10 preferably includes two opposite outrigger arm assemblies 20 which are mounted to opposite sides of irrigation tower frame 7. Preferably, stabilizing apparatus 10 is installed on more than one irrigation tower frame 7 and preferably on several irrigation tower frames 7 of a pivot irrigation apparatus 5 with particular emphases on irrigation towers which are more distant from the center pivot portion (not shown). In this one embodiment, each outrigger arm assembly 20 includes a base bracket assembly 22, an outrigger arm 24, a ground engaging element 26 and an upper retraction bracket assembly 28. In this example, ground engaging element 26 is a wheel 26 but could be any other ground engaging element such as a skid or other low friction device adapted for movement across the ground. For the purposes of this detailed description, ground engaging element 26 will be referred to as "wheel 26". In this example, outrigger arm assemblies 20 are essentially identical and symmetrical. Accordingly, only one outrigger arm assembly 20 will be described in detail and indicated in detail in the figures. The skilled reader will understand that every feature described and indicated for one outrigger arm assembly 20 will be true of the opposite outrigger arm assembly which will not be described or indicated in the figures.

Figure 2:
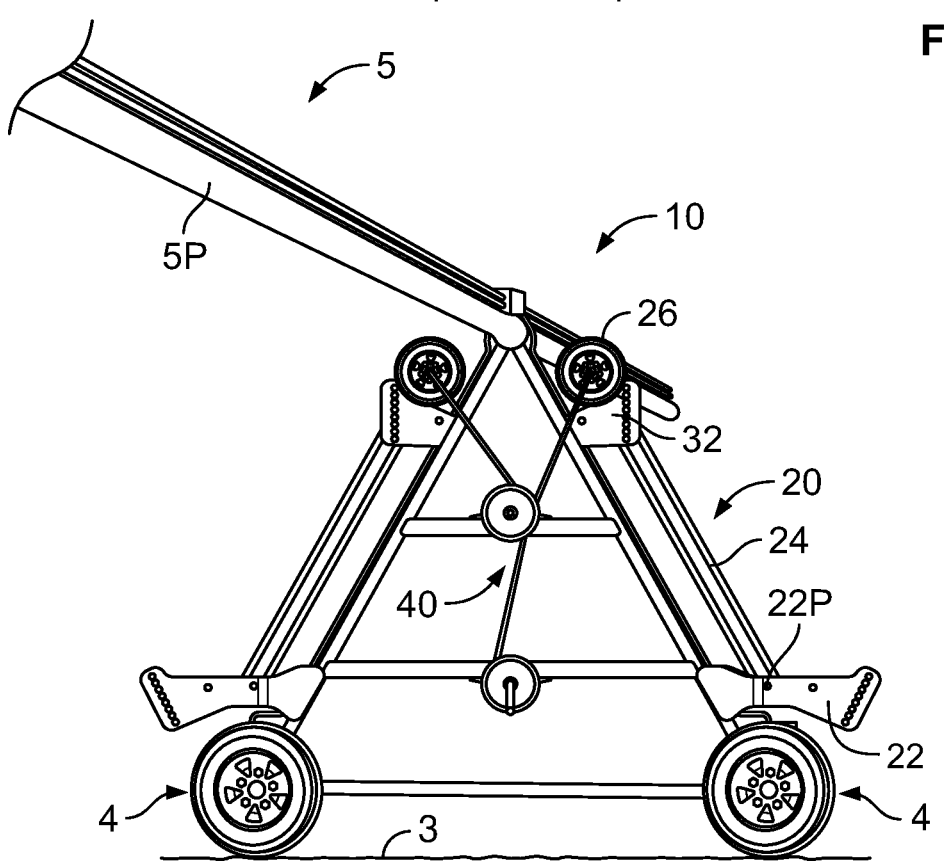
FIG. 2 is a perspective view of the first embodiment of the stabilizing apparatus installed on a tower of a center pivot irrigation system showing the outrigger arms in a retracted position
Figure 3:
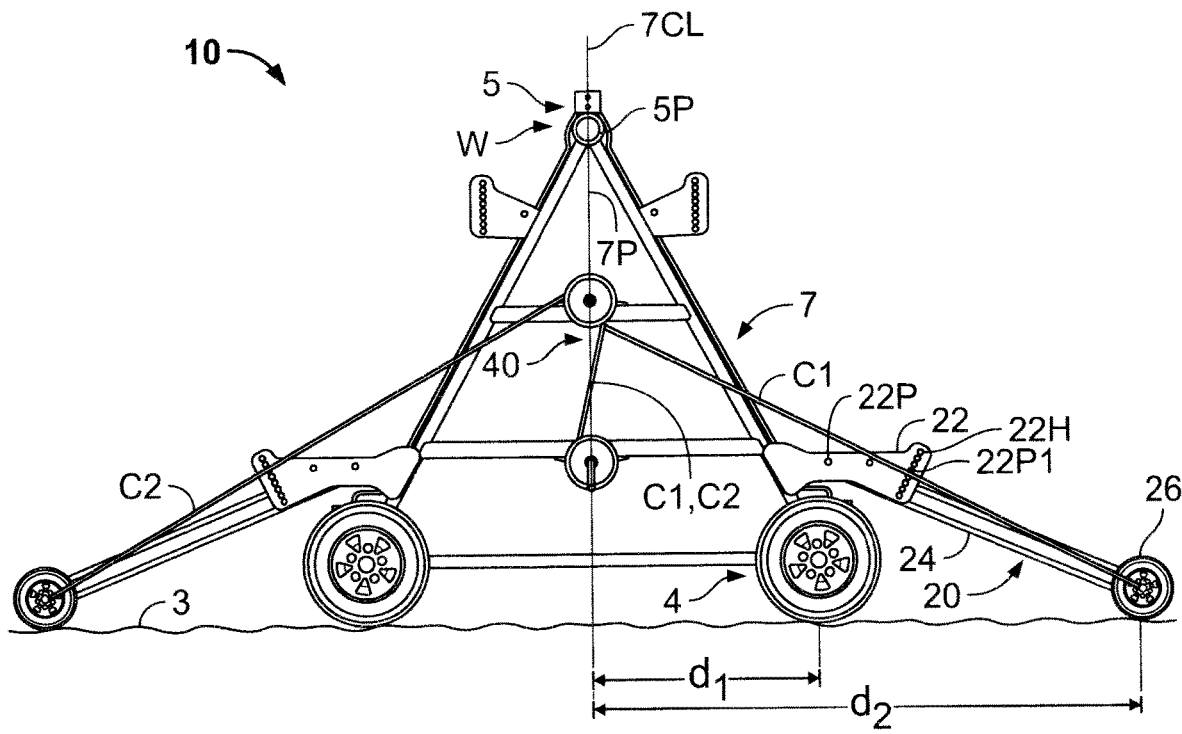
FIG. 3 is a plan view of the first embodiment of the stabilizing apparatus which is a view taken from a direction that is parallel to the irrigation pipe direction of one embodiment of a stabilizing apparatus installed on a tower of a center pivot irrigation system showing the outrigger arms in the extended position.
Figure 4:
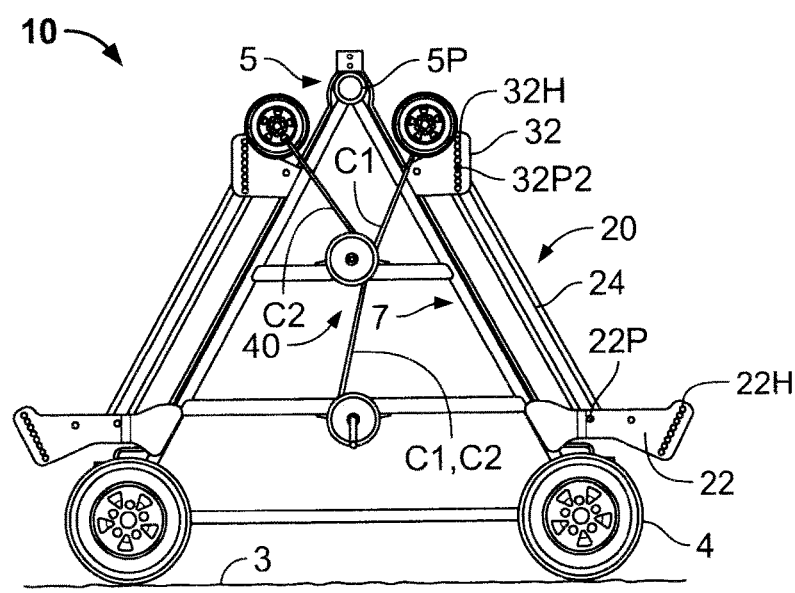
FIG. 4 is a plan view of the first embodiment of the stabilizing apparatus installed on a tower of a center pivot irrigation system showing the outrigger arms in the retracted position.

The movement of outrigger arm assemblies 20 between the extended position and the retracted position can be understood by comparing FIGS. 1 and 3 with FIGS. 2 and 4. As can be seen in FIGS. 1-4, in this example, each outrigger arm assembly 20 is adapted for pivoting movement in relation to an irrigation tower 7 between an extended position shown in FIGS. 1 and 3 and a retracted position shown in FIGS. 2 and 4. In this embodiment, the actuation of the retracting movement is accomplished by means of a manual hand-crank actuated pulley and cable system which will be described in greater detail below. However, a one of many actuation methods may be selected for pivoting outrigger arm assemblies 20. An electric motor may be employed or even hydraulics. Or, it may be possible to merely manually pivot and lift outrigger arms 24 into a retracted position without the aid of an actuation system. Still further, while the applicant has opted to pivot outrigger arms 24 about pivot points 22P presented by base bracket assemblies 22, extension and retraction of wheel 26 may also be accomplished by the sliding, translating or telescoping an outrigger arm or by some other suitable form of movement. Accordingly, wheel 26 need only move between an extended position wherein wheel 26 is positioned away from irrigation tower 7 in the transverse direction and is in contact with or at least in close proximity to farm ground surface 3 essentially as shown in FIGS. 1 and 3 and a retracted position wherein wheel 26 is generally proximate to irrigation tower 7, but not necessarily in the same location shown in FIGS. 2 and 4. (The "transverse direction" should be understood herein by the skilled reader as direction that is generally normal to an upright plane 7P indicated in FIGS. 3 and 5 which would be generally defined by irrigation tower center line 7CL indicated in FIGS. 3 and 5 and the centerline of irrigation pipe 5P of irrigation system 5 indicated in FIGS. 1-4.) Each stabilizer unit 20 is preferably mounted to two or more irrigation towers such as irrigation tower 7 shown in FIG. 1. An important reason for the retraction capability is that it is occasionally necessary to transport entire pivot irrigation systems between fields. Therefore, it is useful to be able to reduce the overall width of the irrigation towers of a pivot irrigation system to facilitate movement and transport of the system.

Figure 5:
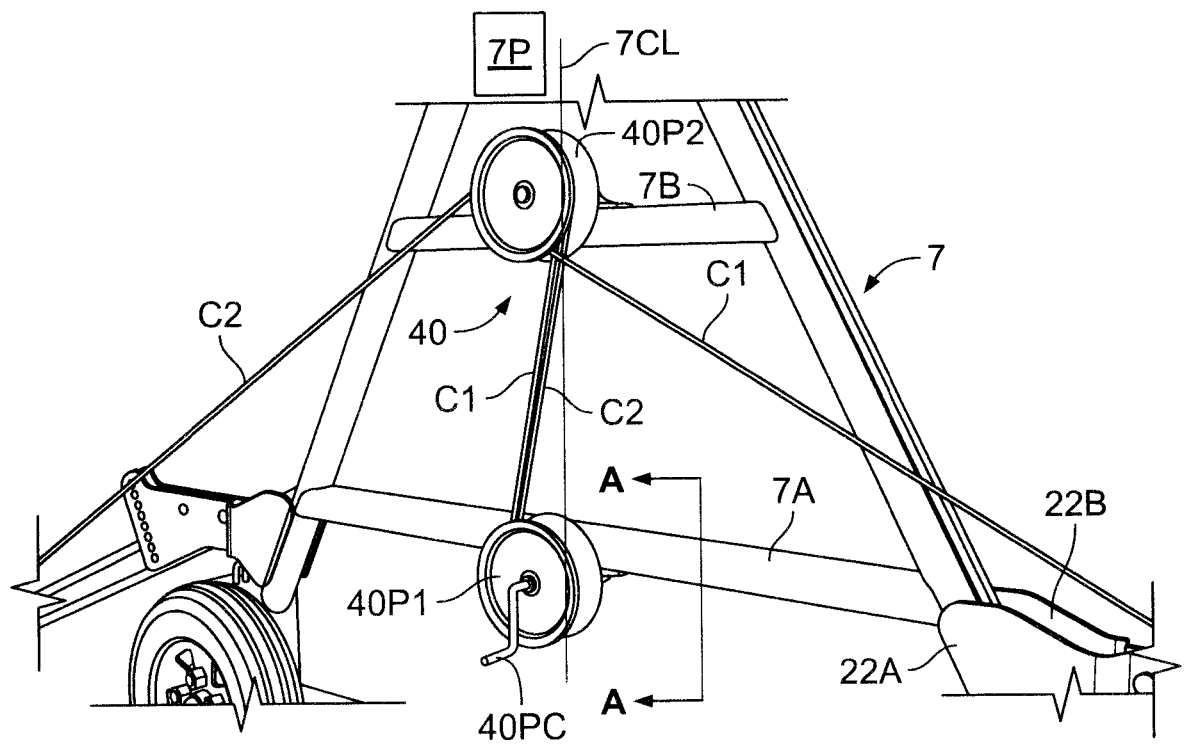
FIG. 5 is a magnified perspective view of the first embodiment of the stabilizing apparatus installed on a tower of a center pivot irrigation system showing the outrigger arms in the extended position showing particularly one embodiment of a cable and pulley system adapted for pivoting the outrigger arms between the extended position and the retracted position.

In FIG. 3, outrigger arm assembly 20 is shown in the extended position with outrigger arm 24 rotated down relative to pivot point 22P of base bracket assembly 22 so that outrigger wheel 26 is in contact with farm ground soil surface 3, or at least in close proximity to farm ground soil surface 3. As can be seen in FIGS. 3 and 5, bracket assembly 22 incudes opposite side plates 22A and 22B which are fixed to tower frame 7 at a location above wheel 4. A pivot bearing of a type well known in the art is located at pivot point 22P. As can be seen in FIGS. 4 and 5, opposite side plates 22A and 22B present a series of corresponding pin holes 22H which are adapted to receive a locking pin 22P1 which is shown to be positioned in FIG. 3 to retain outrigger arm 24 so that outrigger wheel 20 remains generally in contact with farm ground surface 3. When fields are not flat and have undulations, the operator may select a higher pin location to allow wheels 26 to pivot up to prevent high centering drive wheels 4. As can be seen in FIG. 3, when wheel 26 is in the extended position, the effective wheel base width d2 of tower 7 is significantly larger than the typical wheel base width dl. Accordingly, the force of wind W indicated in FIG. 3 needed to overturn tower 7 is increased by such a great degree that it becomes extremely unlikely for straight line winds to overturn tower 7.

In FIG. 4, outrigger arm assembly 20 is shown in the retracted position with outrigger arm 24 rotated up relative to pivot point 22P of base bracket assembly 22 so that outrigger wheel 26 (indicated in FIGS. 1-3) is in a position which is proximate to irrigation tower 7. As can be seen in FIG. 4, an upper bracket assembly 32 is fixed to frame 7. Upper bracket assembly presents two side plates 32A and 32B which are indicated in FIG. 1. As was the case with side plates 22A and 22B of base bracket assembly 22, side plates 32A and 32B present a series of corresponding pin holes 32H which receive pin 32P2 for securing outrigger arm assembly 20 in the retracted position shown in FIGS. 2 and 4.

It is sometimes necessary to relocate a pivot irrigation system between fields to be irrigated. Such a relocation would be greatly complicated by the permanent presence of outrigger arm assemblies essentially as shown in FIGS. 1 and 3. Accordingly, it would be advantageous to have a way to retract outrigger arm assemblies 20. As can be seen by referring to FIGS. 3 and 4, each outrigger arm assembly 20 is able to pivot about pivot joint 22P between the extended position shown in FIG. 3 and the retracted position shown in FIG. 4. The retraction of each outrigger arm assembly 20 is accomplished by an operator who manually operating a retraction mechanism 40. Retraction mechanism 40 is merely one example of a mechanism which may be used to facilitate the pivoting of each outrigger arm assembly 20 between the extended and retracted positions. In this example a system of pulleys and cables is used to accomplish the retracting movement. As can be best seen in FIG. 5, a first lower pulley assembly 40P1 is rotatably mounted to a lower member 7A of irrigation tower frame 7. First lower pulley assembly 40P1 includes a hand-crank 40PC which is used by an operator to actuate retraction mechanism 40. A second upper pulley assembly 40P2 is also rotatably mounted to an upper member 7B of irrigation tower frame 7. Although first and second pulley assemblies 40P1 and 40P2 as shown in FIG. 5 are mounted near a lateral centerline 7CL of irrigation tower frame 7, it is preferable that at least upper pulley assembly 40P2 is mounted on or near the centerline 7CL of irrigation tower frame 7.

Figure 6:
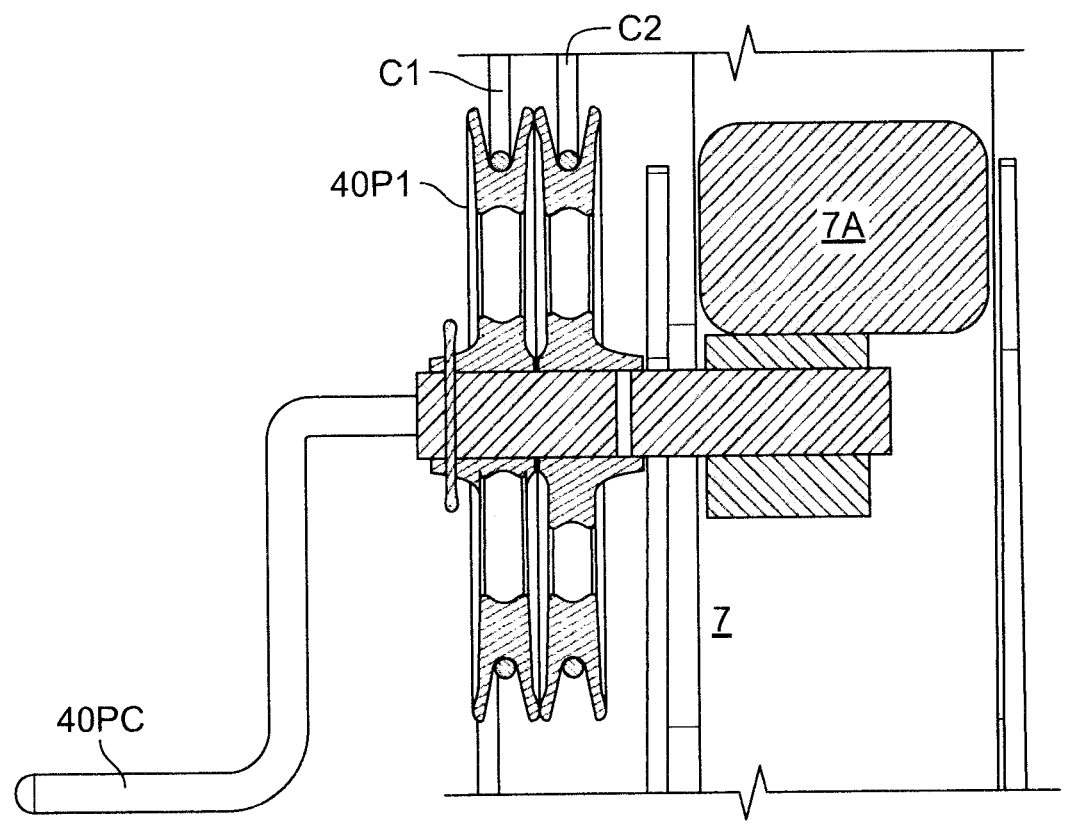
FIG. 6 is a side view of a portion of the pulley and cable system shown in FIG. 5 taken from plane A-A indicated in FIG. 5.

As noted above retraction mechanism 40 includes first lower pulley assembly 40P1 and second upper pulley assembly 40P2. As can be seen in FIG. 5, first lower pulley assembly 40P1 receives two cables, C1 and C2. First lower pulley assembly 40P1 is arranged such that when it is turned counter-clockwise by hand-crank 40PC, cables C1 and C2 are wrapped around first lower pulley assembly 40P1. As can be best seen in FIG. 5, cable C1 raps about 270 degrees around second upper pulley assembly 40P2 and extends out to the end of right outrigger arm assembly 20 as shown in FIG. 3. Cable C1 raps about 120 degrees around second upper pulley assembly 40P2 and extends out to the end of left outrigger arm assembly 20 as shown in FIG. 5. When crank 40PC is turned counter-clockwise, cables C1 and C2 are wrapped around first lower pulley assembly 40P1 which causes cables C1 and C2 between second upper pulley assembly 40P2 and the respective opposite ends of both outrigger arm assemblies 20 to effectively shorten. This action causes the distal ends of outrigger arm assemblies 20 to be pulled up to the retracted position shown in FIG. 5. FIG. 6, which is a magnified view taken from plane A-A of FIG. 5 provides further detail regarding the general lay-out of not only first lower pulley assembly 40P1 but also second upper pulley assembly 40P2 if hand crank 40PC is removed and replaced with a simple shaft. It should be noted that each pulley assembly includes two pulleys so that cables C1 and C2 are carried by one of the two pulleys, respectively, in each pulley assembly. It is further possible to selectively disengage either one of the two pulleys of first lower pulley assembly 40P1 from crank 40PC, so that it is possible to selectively retract only one of the outrigger arm assemblies while leaving the other outrigger arm assembly in the extended position. It may also be possible to have a means for locking lower pulley assembly 40P1 in relation to frame 7 to prevent slack in cables C1 and C2 and to further secure outrigger arm assemblies 20 in the retracted position. Although a manual hand-crank 40PC is used in this example to power retraction mechanism 40, the skilled reader will readily appreciate that any one of a number of power sources may be selected for powering a retraction mechanism.

Outrigger arm assemblies 20 are probably most effective if fashioned from light, strong material. Because of a desire to minimize soil compaction and the power required by wheels 4, the operators of pivot irrigation systems will likely not be receptive to heavy outrigger arm assemblies which are fashioned from heavy materials. Accordingly, a lightweight but capable design would be preferred. An outrigger arm assembly need only be sufficiently durable for agricultural use, be capable supporting its own weight and capable of preventing overturning movement of an irrigation tower 7 during high velocity straight line wind conditions. Accordingly, aluminum or even perhaps various plastics may be acceptable choices for the materials of the various components of stabilizer apparatus 10.

As can be understood from the above detailed description, stabilizer apparatus 10 effectively significantly widens the wheel base of an irrigation tower 7. With the effective increase in the transverse wheel base, the force applied by a wind W indicated in FIG. 3 needed to overturn irrigation tower 7 is increased by such a great degree that the probability that a straight line wind will cause the destructive overturning of a portion of an irrigation system equipped with stabilizer apparatuses of the type described above is greatly reduced.

As can be seen in FIGS. 7-11, a second embodiment of the irrigation tower stabilizing apparatus 110 is installed on a mobile irrigation tower 202. As was the case with irrigation tower 7 described above, mobile irrigation tower 202 is one of a set of mobile irrigation towers which support a center pivot irrigation pipe 302 and which are arranged to describe an arc shaped path around a center pivot in order to pivot irrigation pipe 302 and a series of spaced water sprinklers (not shown) as described above for irrigating a circular portion of a field. Accordingly, mobile irrigation tower 202 includes at least a base member 212, two side members 222 which extend from opposite ends of base member 212 and which join at the upper end to support irrigation pipe 302. As was the case with irrigation tower 7 described above, irrigation tower 202 is supported by two spaced apart wheels 224 which are mounted on opposite ends of base member 212. Wheels 224 are arranged for carrying tower 202 across farm ground 340 along an arc shaped path as described above. At least one of wheels 224 is powered to propel irrigation tower 202. However, in this example, both wheels 224 are powered as is common practice in the art. Irrigation tower stabilizing apparatus 110 includes two opposite stabilizer assemblies 110A and 110B. Stabilizer assemblies 110A and 110B respectively include first and second outrigger arms 112A and 112B, first and second wheels 122A and 122B, first and second cable anchoring members 132A and 132B, first and second pulleys 142A and 142B and first and second cables 152A and 152B.

In this example, only first stabilizer assembly 110A will be described in detail while the skilled reader will appreciate that second stabilizer assembly 110B is symmetrically identical to first stabilizer assembly 110A and has the same features and elements as first stabilizer assembly 110A. However, many of the features and elements of second stabilizer assembly 110B are indicated with a "B" rather than "A" as can be readily seen in FIGS. 7-11. As can be seen in FIGS. 7-11, first outrigger arm 112A of first stabilizer assembly 110A extends between a proximal end and a distal end. The proximal end of outrigger arm 112A is mounted to a side member 222 by a clevis 111A which is fixed to side member 222 and which completes a pivot joint between outrigger arm 112A and side member 222. First outrigger arm 112A is able to pivot within clevis 111A generally in the plane of irrigation tower 202 between a first extended operating position shown in FIG. 7 and a second retracted transport position shown in FIGS. 9 and 11. (The "plane of irrigation tower 202" is generally described by base member 212 and side members 222.) A ground traversing member 122A is mounted to the distal end of outrigger arm 112A. In this example, ground traversing member 122A is a wheel and therefore will be referred to below as wheel 122A. But wheel 122A could be replaced by a skid or any other suitable structure adapted for suitably low friction movement across farm ground 340.

Figure 7:
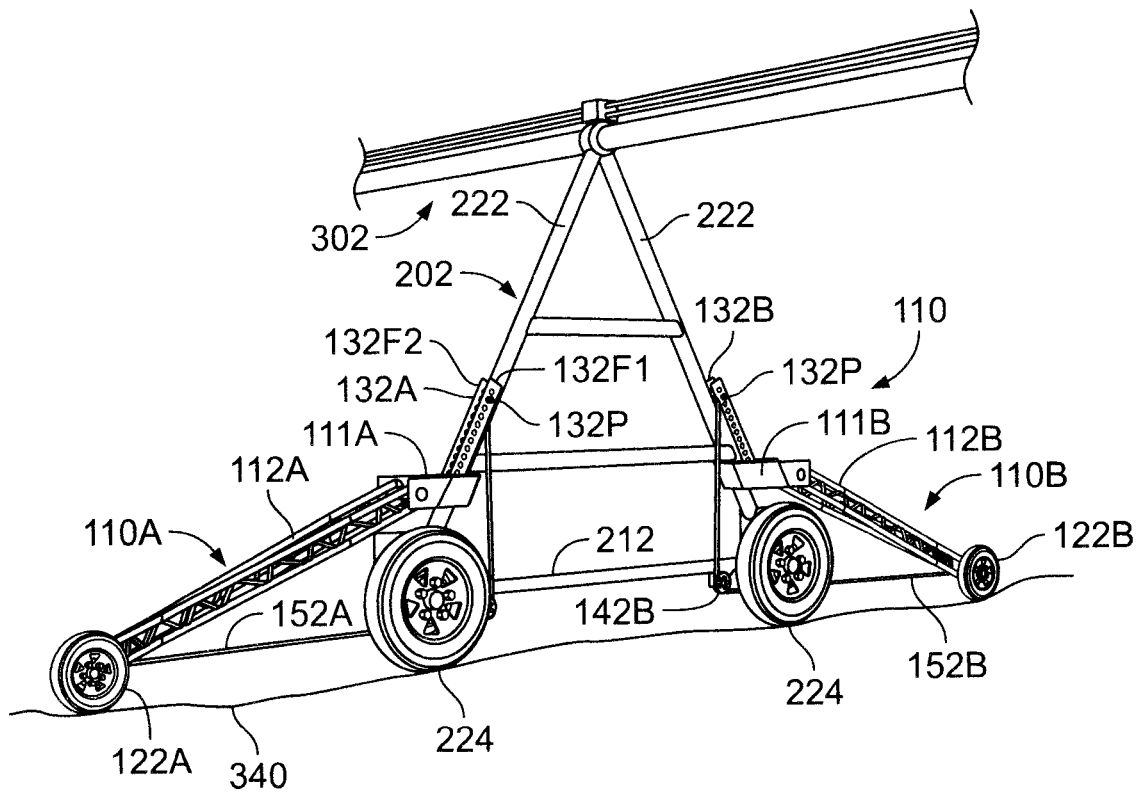
FIG. 7 is a first perspective view of a second embodiment of an irrigation tower stabilizing apparatus installed on a tower of a center pivot irrigation system showing the outrigger arms in an extended position.
Figure 8:
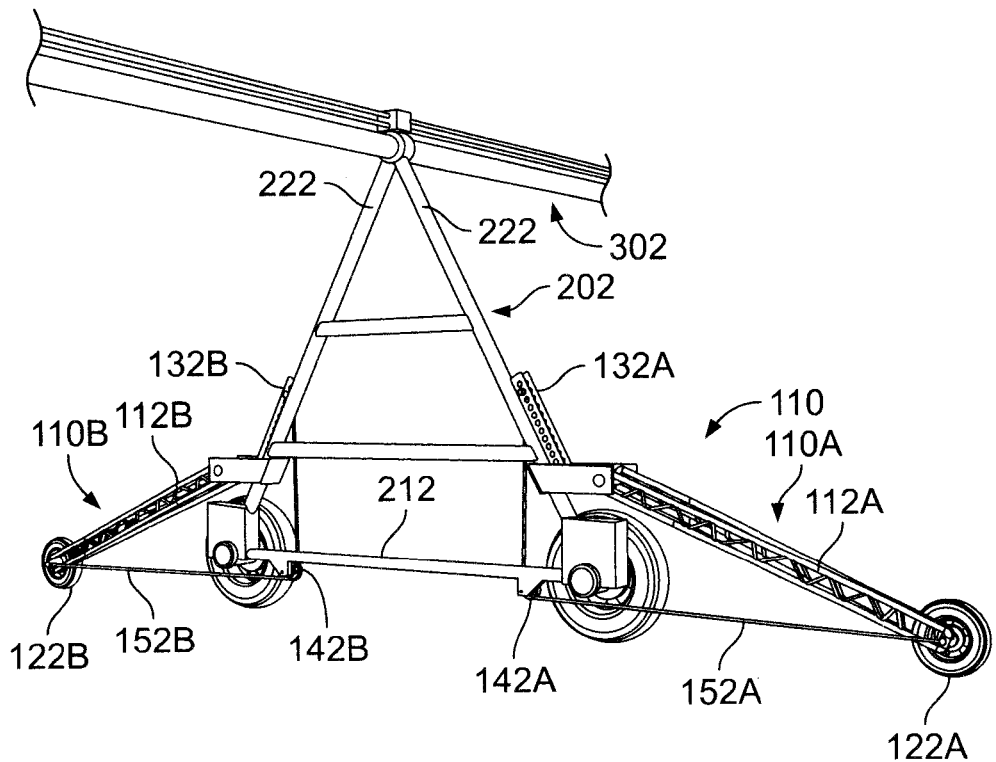
FIG. 8 is a second perspective view of the second embodiment of an irrigation tower stabilizing apparatus installed on a tower of a center pivot irrigation system showing the outrigger arms in the extended position shown from the opposite side as shown in FIG. 7.
Figure 9:
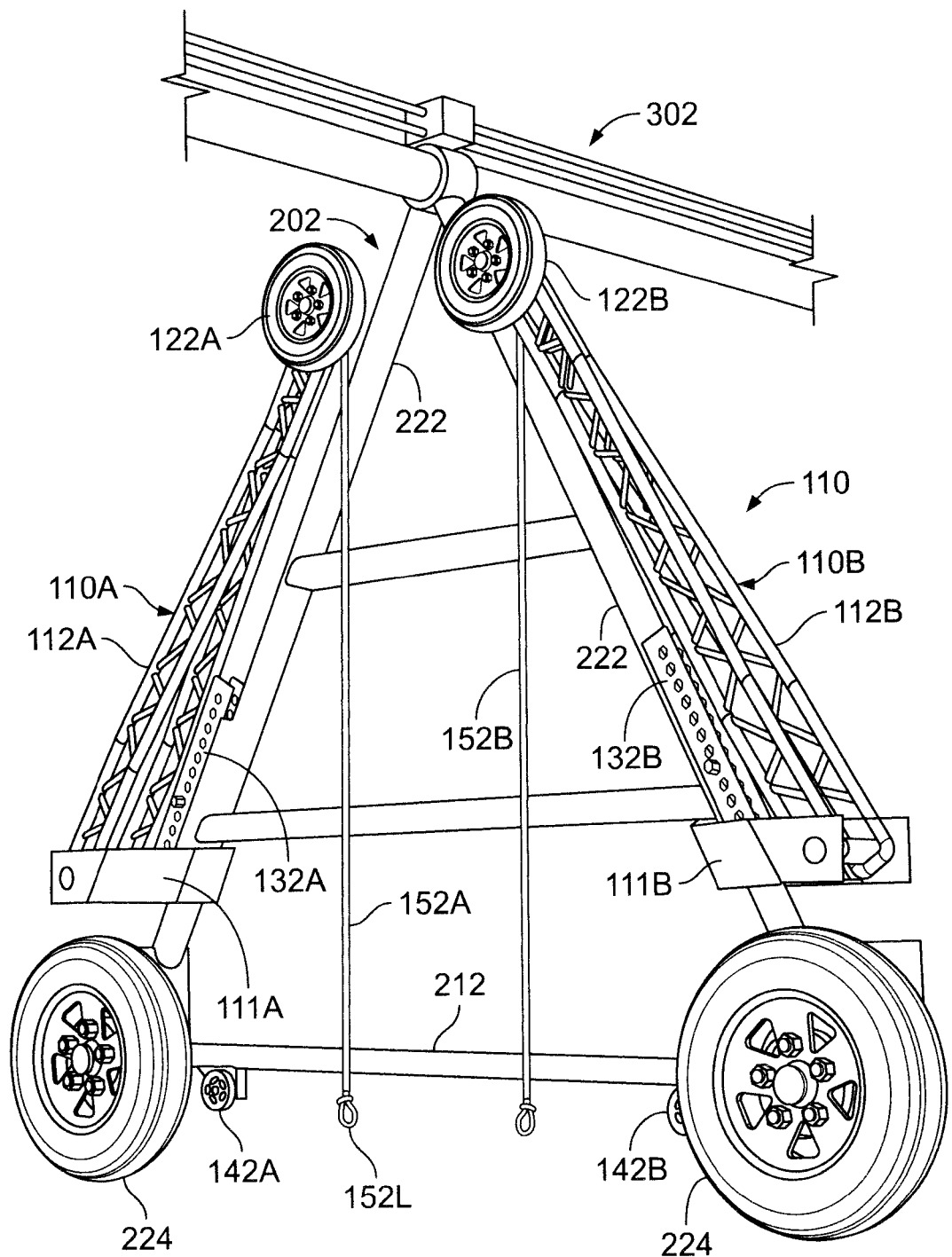
FIG. 9 is a perspective view of the second embodiment of the stabilizing apparatus installed on a tower of a center pivot irrigation system showing the outrigger arms in a retracted position
Figure 10:
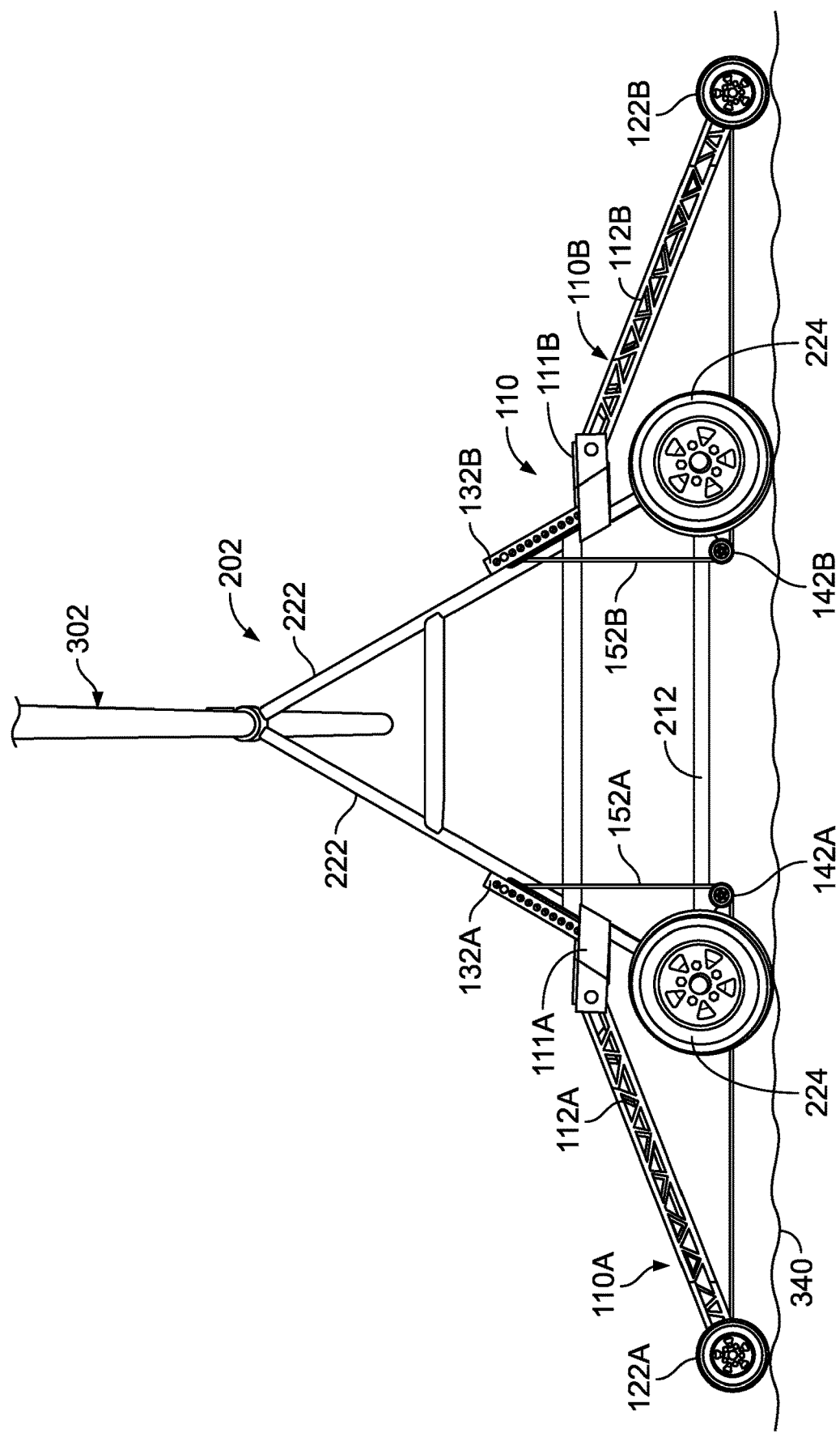
FIG. 10 is a plan view of the second embodiment of the stabilizing apparatus installed on a tower of a center pivot irrigation system taken from a direction that is generally normal to the irrigation tower showing the outrigger arms in the extended position.

In this example, second embodiment stabilizing apparatus 110 employs a cable, pulley and cable anchor arrangement to secure outrigger arms 112A and 112B in the first extended operating position show in FIGS. 7, 8 and 10. Recall that the purpose of stabilizing apparatus 110 is to prevent the irrigation tower 202 from overturning during high wind conditions. Thus, if, for example, the right wheel 224 of tower 202 were to leave the ground during a high wind event, it is vital that the far left wheel 122A at the distal end of outrigger arm 112A remain in an extended position generally as shown in FIGS. 7, 8 and 10 thereby effectively greatly increasing the lateral wheel base of tower 202. The amount of overturning force needed to cause tower 202 to overturn given the additional resistance provided by stabilizer assembly 110A is so large that it is extremely unlikely that tower 202 will be able to turn over during high wind conditions.

Figure 11:
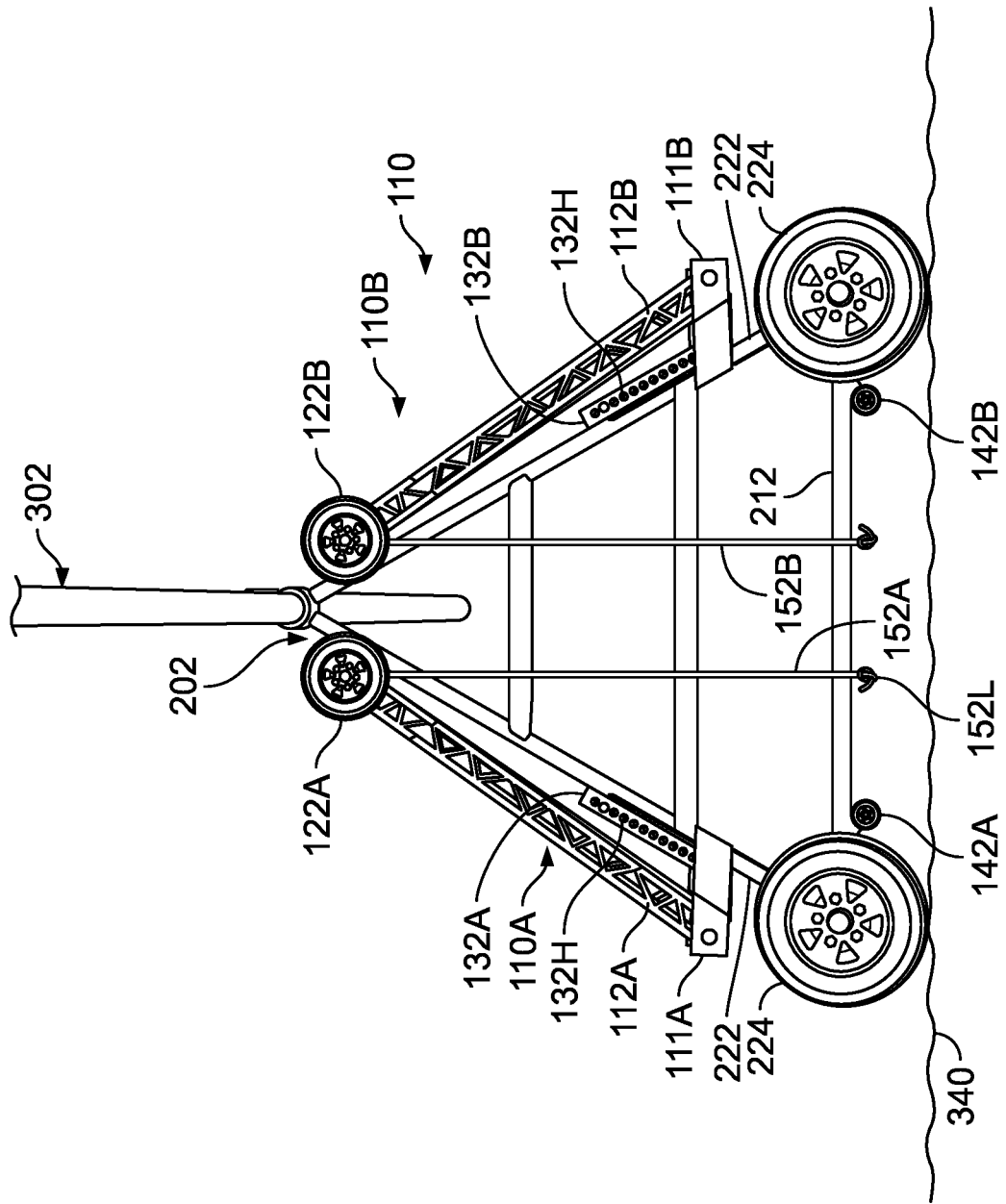
FIG. 11 is a plan view of the second embodiment of the stabilizing apparatus installed on a tower of a center pivot irrigation system showing the outrigger arms in the retracted position.

As can be seen in FIGS. 7-11, cable 152A, pulley 142A and anchor member 132A are used to secure first stabilizer assembly 110A in the extended position shown in FIGS. 7, 8 and 10. The skilled reader will understand that an identical arrangement including a cable 152B, a pulley 142B and an anchor member 132B is present on the opposite side of tower 202 for securing second stabilizer assembly 110B in the same position. As can be seen in FIGS. 7-11, anchor member 132A is mounted to side member 222 of tower 202 adjacent to outrigger arm 112A. As is indicated in FIG. 11, anchor member 132A, in this example, presents a series of holes 132H, which, in this example, are a series of corresponding opposite holes defined in the opposite flanges (132F1 and 132F2 indicated in FIG. 7) of a channel extrusion from which anchor member 132A is fashioned. Pulley 142A, which serves first outrigger arm 112A, is preferably mounted to base member 212 of tower 202 and is preferably mounted generally below anchor member 132A. Preferably, pulley 142A is mounted under anchor member 132 A and most preferably, under the inboard end of anchor member 132A as shown in FIG. 10. Cable 152A is attached to distal end of first outrigger arm 112A at one end and presents an attachment loop 152L (indicated in FIGS. 9 and 11) at its opposite end. Cable 152A extends from the distal end of outrigger arm 112A, runs around pulley 142A and is removably attached by its attachment loop 152L with a pin 132P (indicated in FIG. 7) which, in this example, is passed through one of the pairs of opposite holes 132H presented by spaced flanges 132F1 and 132F2 of anchor member 132. Thus, this cable, pulley and anchor member arrangement secures stabilizer assembly 110A in the extended operating position shown in FIGS. 7, 8 and 10 and prevents first outrigger arm 112A from rotating toward the retracted position shown in FIGS. 9 and 11. An identically symmetrical cable, pulley and anchor arrangement including a cable 152B, a pulley 142B and an anchor member 132B is used to secure second stabilizer assembly 110B in the same way on the opposite side of irrigation tower 202.

As can be understood by referring to FIGS. 7, 8 and 10, it is possible to secure cable 152A to anchor member 132A in an adjustable manner and thereby adjust the slack in cables 152A and 152B by selecting a set of anchor member holes 132H which allows cables 152A and 152B to have a desired amount of slack. Since the slack in cable 132A is adjustable, it is preferable, in this example, that pulley 142A be provided with a cable guide which would be suitable for preventing cable 132A from disengaging from pulley 142A. The availability of adjustable slack in cable 152A makes it possible for irrigation tower 202 to more easily traverse uneven ground without becoming high centered, if sufficient slack in cables 152A and 152B is present. Yet, even if stabilizer assemblies 110A and 110B are allowed a limited range of motion, stabilizing apparatus 110 will continue to prevent overturning movement of tower 202. If pins 132P are removed from anchor member holes 132H it is then possible disconnect cables 152A and 152B from anchor members 132A and 132B and thus to rotate outrigger arms 112A and 112B into the second retracted transport position shown in FIGS. 9 and 11. The second, retracted transport position is suitable for transporting irrigation tower 202.

Various reports indicate that in high wind conditions, irrigation towers can bounce on their wheels which some witnesses report leads to an oscillation which eventually increases in amplitude until a group of towers overturn. Thus, even if there is slack in cables 152A and 152B, it may be possible to tune the resonant frequency of outrigger arms 112A and 112B such that wind driven oscillations of irrigation tower 202 tend to be dampened. If outrigger arms 112A and 112B are out of phase with wind driven oscillations, then it is possible that the presence of stabilizer assemblies 110A and 110B may dampen unwanted wind driven oscillations.

As can be understood from the above detailed description, stabilizer apparatus 110 effectively significantly widens the wheel base of an irrigation tower 7. With the effective increase in the lateral wheel base, the force applied by a wind needed to overturn irrigation tower 202 is increased by such a great degree that the probability that a straight line wind will cause the destructive overturning of a portion of an irrigation system equipped with stabilizer apparatuses of the type described above is greatly reduced. Accordingly, stabilizing apparatus 110 provides a simple, inexpensive and effective apparatus for preventing the destructive and costly overturning of the irrigation towers of pivot irrigation systems during high winds.

A third embodiment of the irrigation tower stabilizing apparatus 510 which is installed on a mobile irrigation tower 402 is shown in FIGS. 12-16. As was the case with irrigation tower 202 described above, mobile irrigation tower 402 is one of a set of mobile irrigation towers which support a center pivot irrigation pipe 302 and which are arranged to describe an arc shaped path around a center pivot in order to pivot irrigation pipe 302 and a series of spaced water sprinklers (not shown) as described above for irrigating a circular portion of a field. Accordingly, mobile irrigation tower 402 includes at least a base member 412, two side members 422 which extend from opposite ends of base member 412 and which join at the upper end to support irrigation pipe 302. As was the case with irrigation tower 202 described above, irrigation tower 402 is supported by two spaced apart wheels 424 which are mounted on opposite ends of base member 412. Wheels 424 are arranged for carrying tower 402 across farm ground 440 along an arc shaped path as described above. At least one of wheels 424 is powered to propel irrigation tower 402. Irrigation tower stabilizing apparatus 510 includes two opposite stabilizer assemblies 510A and 510B.

Figure 12:
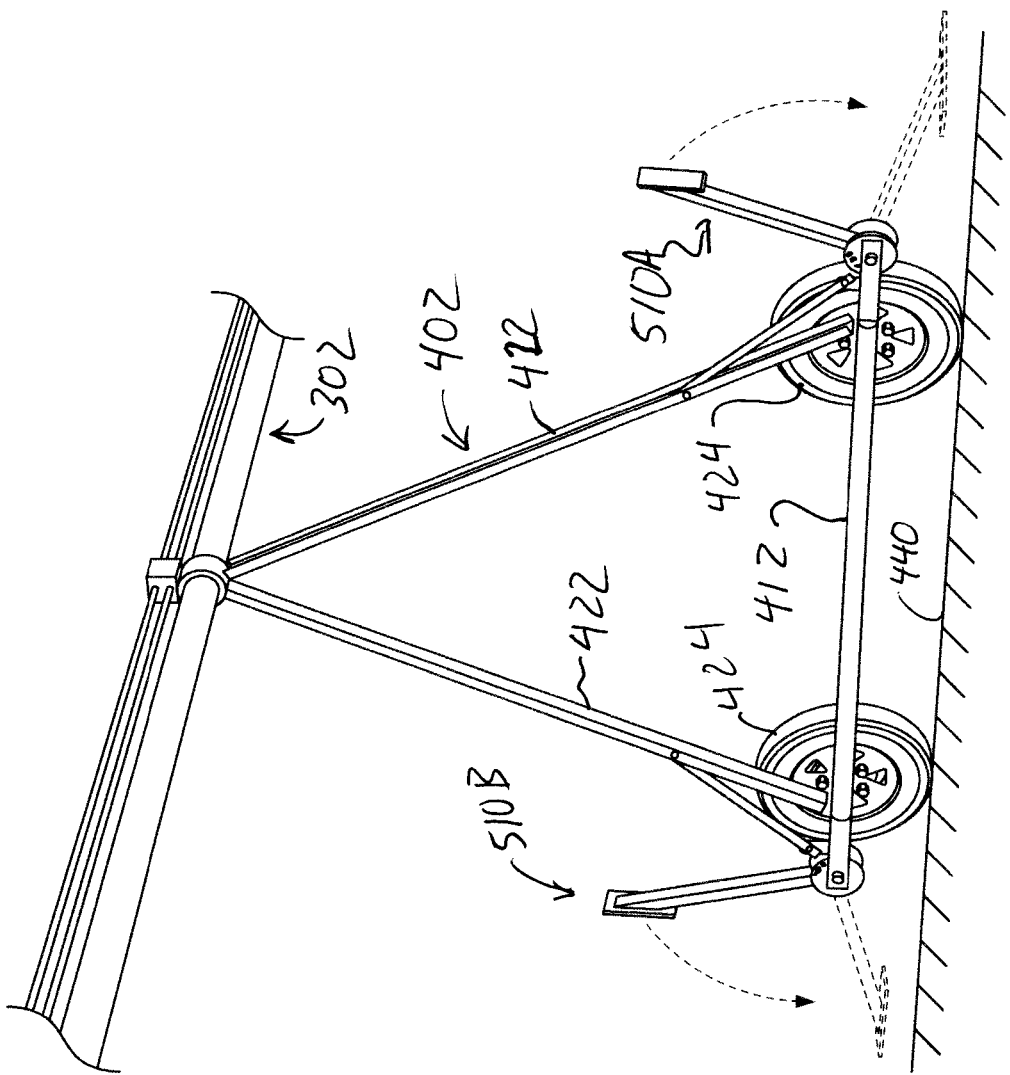
FIG. 12 is a perspective view of a third embodiment of the stabilizing apparatus installed on a tower of a center pivot irrigation system showing the outrigger arms in the retracted position and in phantom in the extended position.
Figure 13:
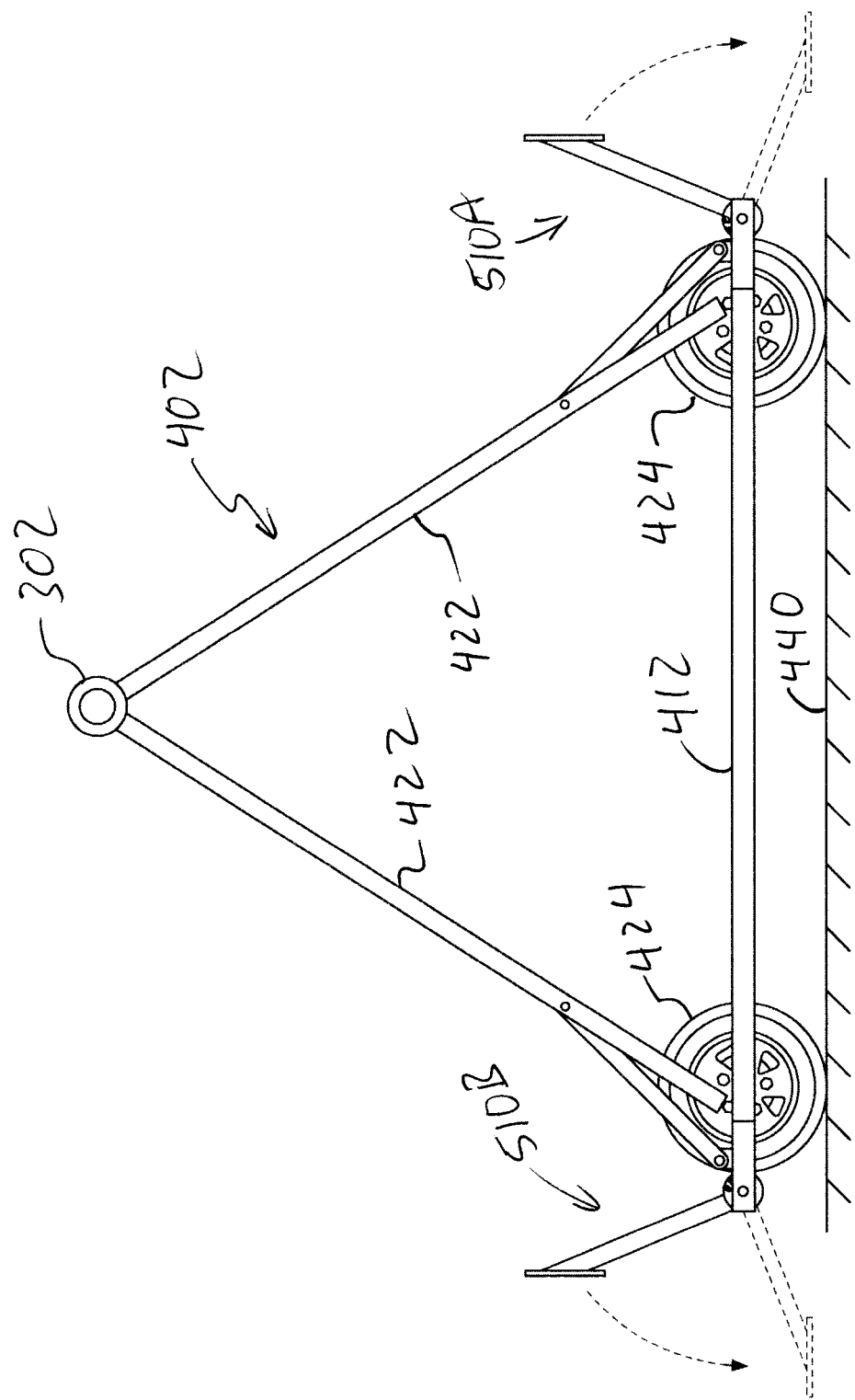
FIG. 13 is a side view of the third embodiment of the stabilizing apparatus installed on a tower of a center pivot irrigation system showing the outrigger arms in the retracted position and in phantom in the extended position.
Figure 15:
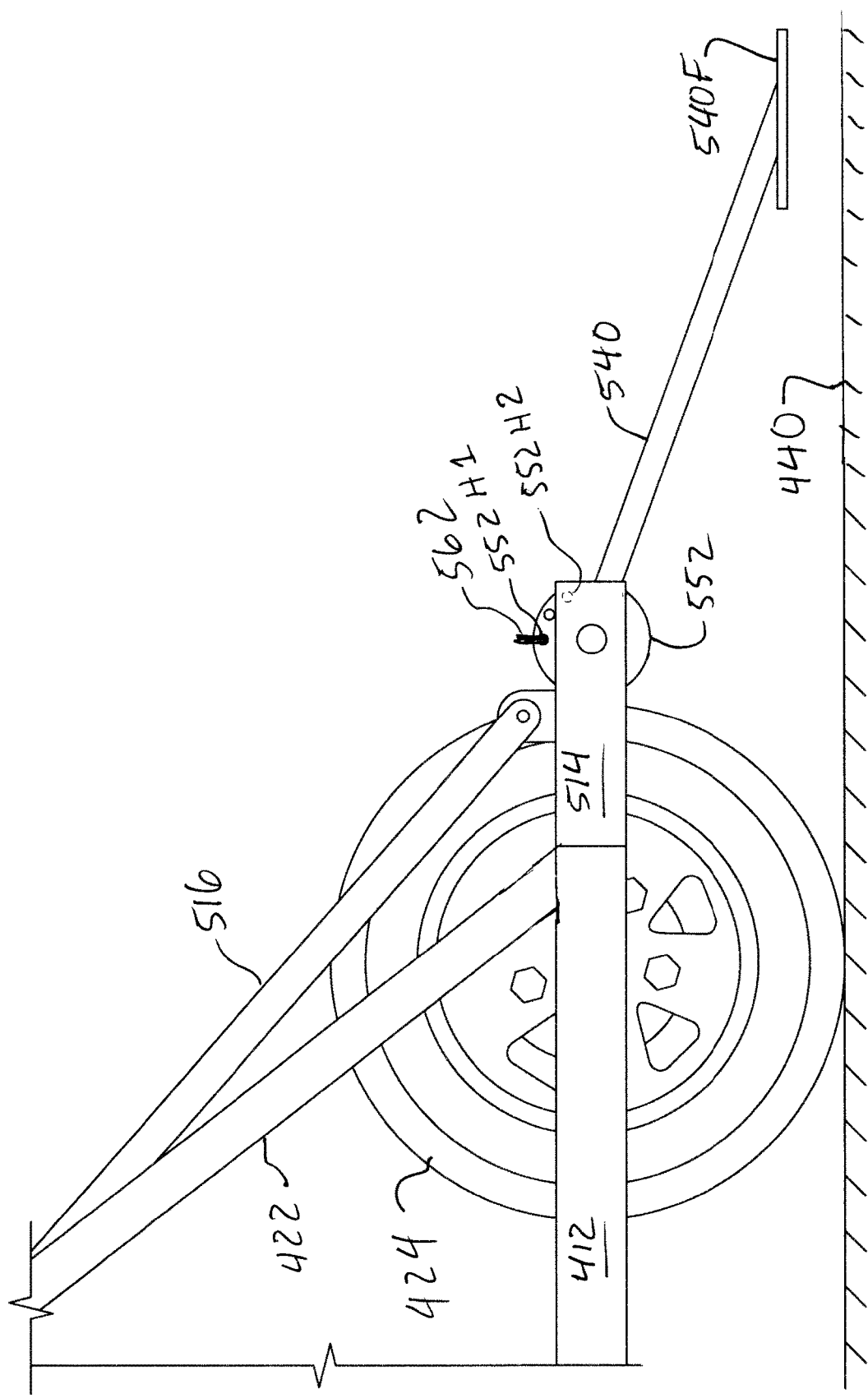
FIG. 15 is an enlarged side view of the third embodiment of the stabilizing apparatus installed on a tower of a center pivot irrigation system showing the right side portion shown in FIG. 13.

Stabilizer assemblies 510A and 510B are symmetrically identical. Accordingly, it will be possible for the skilled reader to understand the configuration of both stabilizer assemblies by referring to right side stabilizer assembly 510A. As can be seen in FIGS. 12, 13 and 15, stabilizer assembly 510A includes a base member extension member 514, a strut 516 and an outrigger arm 532. Extension member 514 is fixed to the distal end of irrigation tower base member 412 and preferably extends laterally from the end of base member 412. Strut 516 connects between side member 422 of irrigation tower 402 and a location on extension member 514 that is, in this example, spaced from the distal end of extension member 514. As is shown in FIGS. 12 and 13, an outrigger arm 540 is pivotably mounted to the distal end of extension member 514 for movement between a first, retracted, storage position shown with solid lines and a second extended, operating position shown with dashed lines. A footpad 540F is fixed to the distal end of outrigger arm 540.

Figure 14:
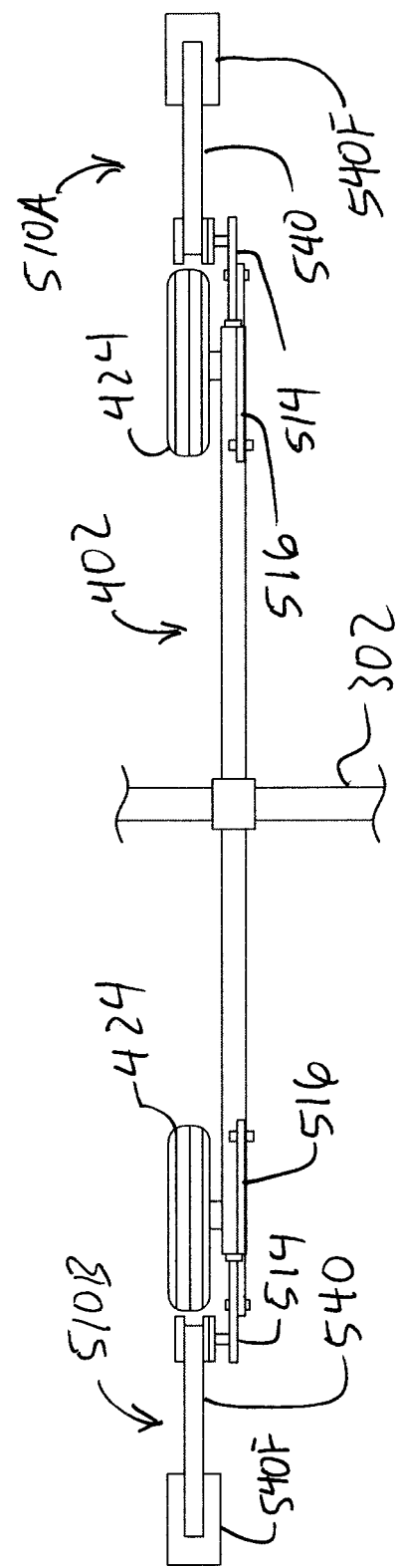
FIG. 14 is a top view of the third embodiment of the stabilizing apparatus installed on a tower of a center pivot irrigation.

As can be best seen in FIG. 14, outrigger arm 540 is pivotably connected to the distal end of extension member 514 in an offset fashion so that outrigger arm 540 aligns with and is in the same plane with wheels 424. This positioning of outrigger arm 540 in alignment with wheels 424 minimizes damage to crop plants. Wheels 424 will cause damage to crop plants as irrigation tower 402 traverses a field. The addition of outrigger arms 540 will not cause additional damage to crop plants because they are restricted to the same path as wheels 424. Accordingly, outrigger arms 540 may be left in the second, extended working position at all times when the irrigation system is in use. Thus, if a wind storm arises at any time, the outrigger assemblies 510A and 510B will be in the extended position for preventing the overturning of irrigation tower 402.

Figure 16:
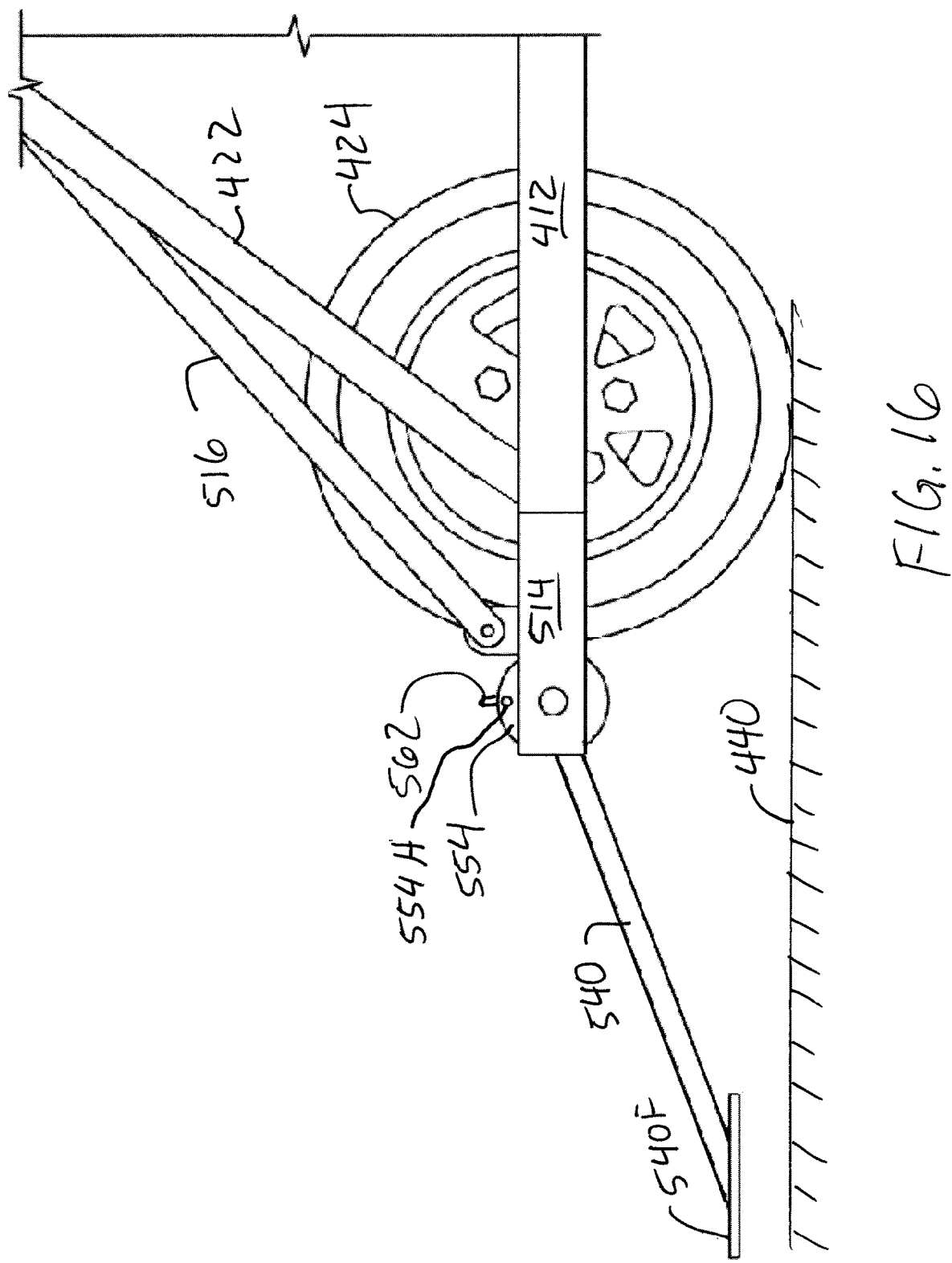
FIG. 16 is an enlarged side view of the third embodiment of the stabilizing apparatus installed on a tower of a center pivot irrigation system showing the right side portion as shown in FIG. 15 but from the opposite direction as shown in FIG. 15.

Stabilizer assemblies 510A includes a locking structure that can be used to secure outrigger arm 540 either in the retracted, storage position shown with solid lines in FIGS. 12 and 13 or the second extended, operating position shown in FIGS. 15 and 16. In this example, two circular locking plates, first plate 552 and second plate 554 are employed to provide holes that align to receive a removable locking pin 652. First plate 552 is fixed outrigger arm 540. Second plate 554 is fixed to extension member 514. As is shown in FIG. 15, in this example, first plate 552 presents a plurality of locking holes including first locking hole 552H1 and second locking hole 552H2. FIG. 16 shows the opposite side from that shown in FIG. 15. In FIG. 16, in this example, second plate 554 is shown and second plate 554 presents, in this example, one locking hole 554H. With reference to FIG. 15, a skilled reader can see that if first plate locking hole 552H1 is aligned with second plate locking hole 554H and pin 562 is inserted through both holes, outrigger arm 540 will be secured in the second, extended position shown in FIG. 15. Also by referring to FIG. 15, a skilled reader can see that if first plate second locking hole 552H2 is aligned with second plate locking hole 554H and pin 562 is inserted through both holes, outrigger arm 540 will be secured in the first, retracted position shown with solid lines in FIGS. 12 and 13.

When the irrigation system is in use and pipe 302 is being supported by towers 402 as the system is rotating around a field, wheels 424 and tower 402 travers the field in a circular path. As the skilled reader may easily imagine, crop plants (not shown) will likely be disturbed by the traversing tower 402. Accordingly, the skilled reader will note by referring to FIG. 14 that outrigger arms 540 are aligned with wheels 424 in order to minimizing crop damage. It is preferable that when the irrigation system is in use, outrigger arms 540 are arranged in the second, extended, operating position shown in FIGS. 15 and 16. When this approach is followed, the irrigation system is continuously protected against overturning winds. Should severe side winds developed, the footpads 540F at the ends of extended outrigger arms 540 will make contact with the ground if irrigation tower 402 begins to tip over and thereby prevent the tower from tipping. The skilled reader will also notice that it is preferable to maintain footpads 520 slightly above the level of ground 440 to prevent footpads 540F from contacting ground 440 as the tower traverses ground 440. Optionally, footpads 540F may also be replaced by wheels (not shown).

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An irrigation tower stabilizing apparatus for stabilizing a mobile irrigation tower of a pivot irrigation system, the irrigation tower including a base member and two side members and having wheels including at least one powered wheel, the wheels being rotatably mounted near opposite ends of the base member for rolling upon and traversing farm ground, the irrigation tower stabilizing apparatus comprising:

a base member extension member fixed to and extending laterally from each opposite end of the base member of the irrigation tower, each base member extension member having a proximal end that is attached to the irrigation tower base member and a distal end that is spaced away from the irrigation tower base member, a strut connecting between a location on each side member of the irrigation tower at a location spaced away from the base member and also connected to each of the base member extension members at a location that is spaced away from the proximal end of each of the base member extension members, an outrigger arm pivotably connected to each of the distal ends of the base member extension members, each outrigger arm having a proximal end and a distal end and a pad fixed to each distal end of each outrigger arm, each outrigger arm being able to pivot between first, retracted, storage position and a second extended, stabilizing position such that the distal end of the outrigger arm is extended laterally away from the irrigation tower and such that the pad of the outrigger arm is at least in close proximity to the farm ground, each base member extension member having a first plate fixed to the distal end of each base member extension member, each first plate presenting at least one locking hole, each outrigger arm having a second plate fixed to the proximal end of each outrigger arm, each second plate presenting a plurality of locking holes, such that by inserting a pin though aligned corresponding one of the locking holes of each second plate and the at least one locking hole of each first plate, each of the outrigger arms is able to be secured in at least either the first retracted or the second extended, stabilizing position.

2. The irrigation tower stabilizing apparatus of claim 1, wherein:

each outrigger arm is arranged to be positioned in an aligned fashion with at least one wheel of the irrigation tower.

* * * * *